(12) United States Patent
Pedro de Matos (10) Patent No.: US 9,875,467 B2
(45) Date of Patent: Jan. 23, 2018

(54) BUSINESS INTELLIGENCE REPORT PROVIDER

(71) Applicant: Oracle International Corporation, Redwood Shores, CA (US)

(72) Inventor: Lucio D'Orazio Pedro de Matos, Antelope, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 292 days.

(21) Appl. No.: 13/645,640

(22) Filed: Oct. 5, 2012

(65) Prior Publication Data

US 2014/0101010 A1 Apr. 10, 2014

(51) Int. Cl.
*G06Q 20/00* (2012.01)
*G06F 17/30* (2006.01)

(52) U.S. Cl.
CPC ....... *G06Q 20/00* (2013.01); *G06F 17/30477* (2013.01)

(58) Field of Classification Search
CPC .............. G06Q 20/00; G06F 17/30427; G06F 17/30477; G06F 21/6218
USPC ............................................. 709/219; 705/34
See application file for complete search history.

(56) References Cited

U.S. PATENT DOCUMENTS

| | | | |
|---|---|---|---|
| 6,366,915 B1* | 4/2002 | Rubert et al. ................. 707/770 |
| 6,651,054 B1* | 11/2003 | de Judicibus | |
| 7,499,875 B1* | 3/2009 | May et al. ................... 705/26.3 |
| 7,720,808 B2* | 5/2010 | Lin ........................ G06Q 10/10 707/600 |
| 7,945,589 B1* | 5/2011 | Weiss ........................ G06F 8/71 707/795 |
| 7,970,783 B2* | 6/2011 | Potter et al. .................. 707/760 |
| 2002/0073237 A1* | 6/2002 | George ......................... 709/246 |
| 2004/0039929 A1* | 2/2004 | Decime ......................... 713/193 |
| 2004/0252134 A1* | 12/2004 | Bhatt ............... G06F 17/30554 345/619 |
| 2004/0260658 A1* | 12/2004 | Dettinger et al. ............ 705/400 |
| 2005/0182655 A1* | 8/2005 | Merzlak ................. G06Q 50/24 705/2 |
| 2005/0283446 A1* | 12/2005 | Dettinger et al. ............ 705/400 |
| 2006/0026176 A1* | 2/2006 | Dettinger et al. ............ 707/100 |
| 2007/0299937 A1* | 12/2007 | Winter ................ H04L 67/1095 709/219 |
| 2008/0010243 A1* | 1/2008 | Weissman et al. ................ 707/2 |
| 2008/0086495 A1* | 4/2008 | Kiziltunc et al. ............. 707/102 |
| 2008/0288451 A1* | 11/2008 | Jiang et al. ........................ 707/3 |
| 2009/0150298 A1* | 6/2009 | Furman et al. ................. 705/80 |
| 2009/0177638 A1* | 7/2009 | Bergstrom ........................ 707/4 |

(Continued)

*Primary Examiner* — Florian M Zeender
*Assistant Examiner* — Milena Racic
(74) *Attorney, Agent, or Firm* — Miles & Stockbridge P.C.

(57) ABSTRACT

A system for providing a business intelligence report for a user. The system displays a list of available business intelligence reports. The system receives a request, from a business intelligence application, for at least one business intelligence report from the list of available business intelligence reports. The system provides configuration details to the business intelligence application. The configuration details determine a query. The business intelligence application performs the query on business data of a user database. The at least one business intelligence report is based upon the results of the query.

18 Claims, 6 Drawing Sheets

(56) References Cited

U.S. PATENT DOCUMENTS

| | | | |
|---|---|---|---|
| 2009/0199158 A1* | 8/2009 | Bolf | G06F 17/30896 717/107 |
| 2010/0287014 A1* | 11/2010 | Gaulin et al. | 705/7 |
| 2011/0276867 A1* | 11/2011 | MacHalek | 715/212 |
| 2011/0295882 A1* | 12/2011 | Mascarenhas | G06F 17/30427 707/769 |
| 2012/0130987 A1* | 5/2012 | Bose et al. | 707/718 |
| 2012/0179699 A1* | 7/2012 | Ward et al. | 707/754 |
| 2012/0260341 A1* | 10/2012 | Chan | G06F 17/30477 726/23 |
| 2013/0138683 A1* | 5/2013 | Faitelson et al. | 707/769 |
| 2013/0159831 A1* | 6/2013 | Weller | G06F 17/211 715/209 |
| 2013/0174063 A1* | 7/2013 | Chmiel et al. | 715/762 |
| 2013/0290825 A1* | 10/2013 | Arndt et al. | 715/227 |
| 2014/0025626 A1* | 1/2014 | Mefford et al. | 707/603 |

\* cited by examiner

BUSINESS INTELLIGENCE REPORT PROVIDER

FIELD

One embodiment is directed generally to a computer system, and in particular to a computer system that provides a business intelligence report.

BACKGROUND INFORMATION

Business intelligence is defined as the ability of an organization to produce meaningful and useful information to enable more strategic and effective decision-making. Business intelligence allows the organization to provide the appropriate information, at the appropriate time, via the appropriate channels, to the appropriate personnel. Business intelligence technologies may provide assessments of past, current, and future business processes and effects. Business intelligence technologies may also enable better business decision-making by analyzing structured data and business processes.

Business intelligence may achieve the above by performing reporting functions, data mining functions, analytic functions, and predictive functions, for example. With regard to reporting functions, reports are generally understood as documents directed at relaying information in a presentable form to a user. Reports often aim to present information related to a focused topic to the user. A report used within the field of business intelligence reporting may have a specific formatting-standard and purpose.

A business intelligence report may allow a user to make informed decisions that accomplish desired goals and objectives. For example, a business intelligence report may enable the user to understand how best to manage resources and time.

SUMMARY

One embodiment is a system for providing a business intelligence report for a user. The system displays a list of available business intelligence reports. The system receives a request, from a business intelligence application, for at least one business intelligence report from the list of available business intelligence reports. The system provides configuration details to the business intelligence application. The configuration details determine a query. The business intelligence application performs the query on business data of a user database. The business intelligence report is based upon the results of the query.

BRIEF DESCRIPTION OF THE DRAWINGS

FIG. 1 is a screen shot of an interface of a business intelligence store that allows a user to purchase business intelligence reports.

DETAILED DESCRIPTION

One embodiment is a system including a business intelligence store that allows developers of business intelligence reports to provide their configured business intelligence reports for sale. The business intelligence store may operate as a cloud service and allow customers to search for business intelligence reports compatible with their specific business application. The business intelligence store may also allow customers to read descriptions and ratings of the business intelligence reports and to provide payment to use the reports. In certain embodiments, a customer could be charged for each use of a report.

Useful business intelligence reports provide valuable insights and enable users to make good decisions. In order to produce effective business intelligence reports, a user may need Structured Query Language ("SQL") expertise, business analysis expertise in a certain industry (e.g., government, education, healthcare, Customer Relationship Management ("CRM"), support, etc.), and also expertise on how the business data is organized in a database.

Producing a business intelligence report, using the known methods, can be difficult because it is difficult to find professionals with the combined expertise as described above. Although software vendors release reporting products that enable business analysts to create their own ad-hoc reports, the software features of these reporting products are not able to match the results that a SQL expert can achieve. Further, although SQL experts can be found, these SQL experts generally lack the requisite business analysis skills for generating useful business intelligence reports. SQL experts especially lack requisite business analysis skills when trying to work with businesses in vertical segments.

Further, even when a user is able to find a professional with all of the combined expertise to produce effective reports, the cost of producing these reports may be prohibitively high. A business department may not be willing to pay thousands of dollars each month to receive such reports.

Users may avoid needing to find and hire professionals with the above-described combined expertise if the users use pre-defined business intelligence ("BI") products. A BI product may store report configurations and is usually set up by a separate developer or administrator. The BI product connects to a database of the user (i.e., a database storing business data) to run queries. The BI product then prepares the retrieved data results of the queries into a pre-defined format that the user can view. For example, the pre-defined format can be a hypertext markup language ("HTML") formatted page that users view using a web browser. However, a BI service provider (e.g., a BI store) may have difficulty selling/providing additional services/functionality to users that use these BI products because these users are concerned with the security of their databases and generally do not want any third party BI service provider having access to the data within the databases.

In view of the above, one embodiment provides a business intelligence ("BI") store that allows third-party developers to provide ad-hoc reports for sale. The BI store may operate as a cloud service and enable users to look for ad-hoc reports for a specific business application (i.e., "CRM OnDemand Release 19"), read descriptions and ratings of the ad-hoc reports, and pay to use a report. One embodiment provides reports by separating functions across different systems so that user business data remains inaccessible to portions of the BI system. For example, in one embodiment, the BI store operates without having access to user business data. The user business data may be inaccessible outside of a private network of the user, inaccessible to the BI store, and/or inaccessible to third-party developers of reports.

In one embodiment, the BI store allows the user to be charged per usage of a report by tracking the user's interaction with the report using the BI Store. Although the BI store tracks the user's interaction with the report, the BI store is not granted access to the user's database. Because the BI store is not granted access to the user's database, security of the user's database can be maintained. As such, certain embodiments allow users to interact with the BI Store, pay for use of reports developed by others, and have the report usage tracked at the BI store (generally for payment purposes), while ensuring that the users' databases are secure from third parties.

FIG. 1 is a screen shot of an interface 100 of a business intelligence store that allows a user to purchase business intelligence reports. For example, suppose a user has a business application (e.g., CRM OnDemand Release 19) and would like to run some reports. In one embodiment, the user browses the BI store via interface 100 in search for ad-hoc reports provided for this particular business application. The user sees descriptions 101, ratings 102, and pricing 103 of each report, and possibly even runs a limited free trial. Once the user decides to use a report, the user could be charged a fee (e.g., $1) for each execution of the report. As the user modifies the information of the report (e.g., arranging, adding, removing, transforming, and filtering the information) or changes parameter values to run the report again, the user would be charged a fee (e.g., $1) each time. As such, extra charges would be incurred (per usage) each time the user runs the report with new parameters, filters, aggregate functions, etc.

In another embodiment, if the user runs the same exact report (same filters, same parameters . . . ) multiple times in the same month, only one fee would be applied. In another embodiment, the user has the option of purchasing a report for unlimited use in exchange for a higher price (e.g., $50). In another embodiment, the developer of the report could receive a percentage of the proceeds of the sale (or the "per use" charge).

In one embodiment, the system includes a configuration of: (1) a BI store, (2) a user database, and (3) a user/customer client computer with a user BI application (e.g., a web portal) stored thereon. The BI store includes an application and a database. The BI store provides code for ad-hoc reports, indicates which business application the reports are compatible with, indicates the ratings of the reports, and provides any additional filters, functions, input parameters, graphs, or other customizable features of the reports. The user database may be a data warehouse associated with a specific business application (e.g., CRM OnDemand).

In another embodiment, the user BI application is not stored on the client computer. Instead, the user BI application may be a web application implemented on the user's own private network. The user BI application could also be on a web server or could be a web interface on a database server (e.g., Oracle APEX or Oracle HTML DB). The user BI application could also be desktop client software (e.g., a Java plugin). The user BI application may include means to log into the user database and to log into the BI store. In one embodiment, the user BI application is an application distributed by the BI store. The user BI application stores credentials for accessing the user database and the BI store, and may require credentials from users trying to run reports via the BI application. In one embodiment, the user BI application is an APEX application that the user can install, import, and have ready for use.

With regard to the user client computer, the user client computer may provide an additional application that will present the report to the user. In one embodiment, the additional application on the client computer is a web browser.

Figure 2:
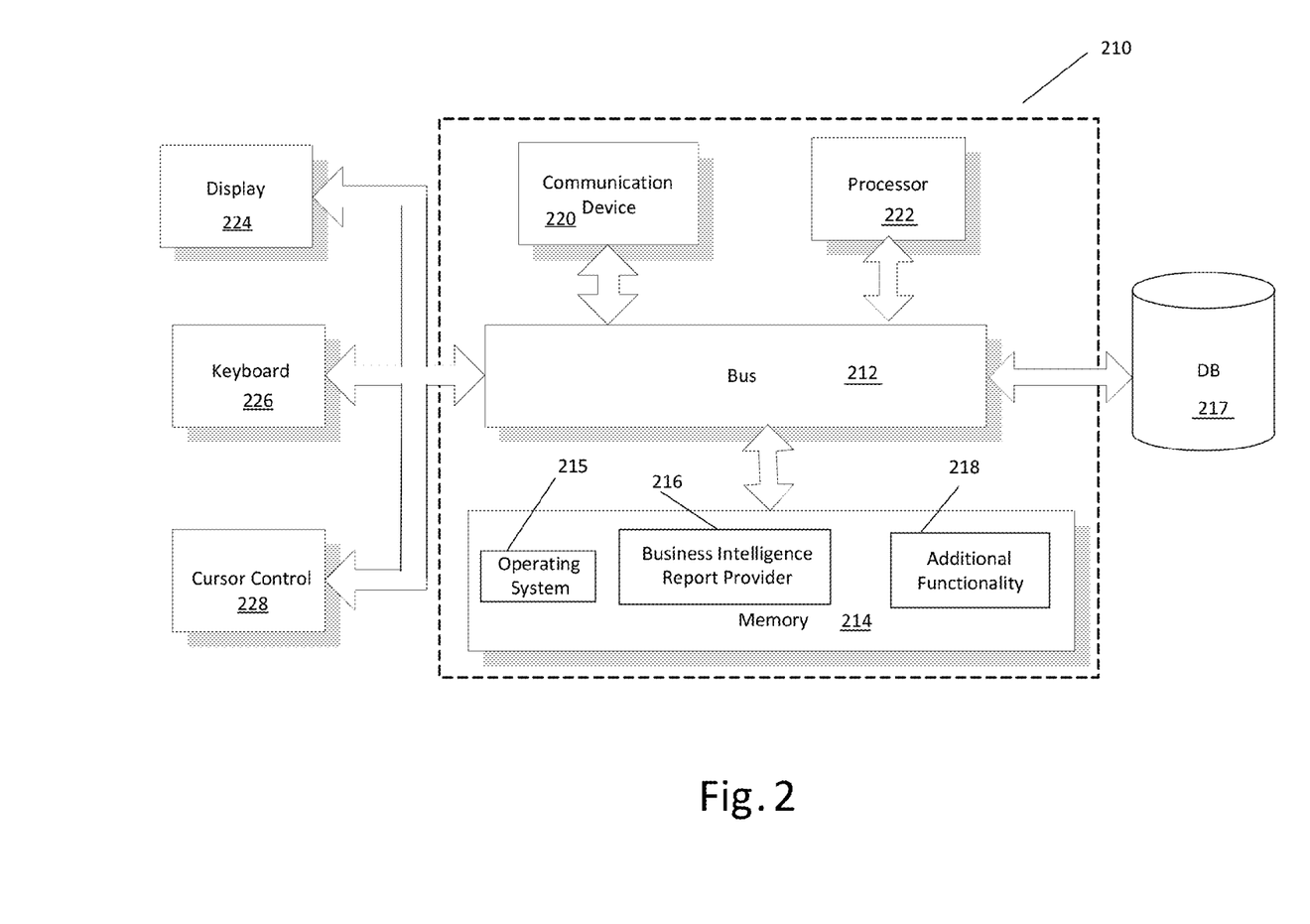
FIG. 2 is an overview block diagram of a computer server/system in accordance with an embodiment of the present invention.

FIG. 2 is an overview block diagram of a computer server/system 210 in accordance with an embodiment of the present invention. Although shown as a single system, the functionality of system 210 can be implemented as a distributed system. System 210 includes a bus 212 or other communication mechanism for communicating information, and a processor 222 coupled to bus 212 for processing information. Processor 222 may be any type of general or specific purpose processor. System 210 further includes a memory 214 for storing information and instructions to be executed by processor 222. Memory 214 can be comprised of any combination of random access memory ("RAM"), read only memory ("ROM"), static storage such as a magnetic or optical disk, or any other type of computer readable media. System 210 further includes a communication device 220, such as a network interface card, to provide access to a network. Therefore, a user may interface with system 210 directly, or remotely through a network or any other known method.

Computer readable media may be any available media that can be accessed by processor 222 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 222 may be further coupled via bus 212 to a display 224, such as a Liquid Crystal Display ("LCD"). A keyboard 226 and a cursor control device 228, such as a computer mouse, may be further coupled to bus 212 to enable a user to interface with system 210.

In one embodiment, memory 214 stores software modules that provide functionality when executed by processor 222. The modules include an operating system 215 that provides operating system functionality for system 210. The modules further include business intelligence report provider module 216 that provides a user with a business intelligence report, as disclosed in more detail below. System 210 can be part of a larger system. Therefore, system 210 will typically include one or more additional functional modules to include additional functionality, such as transaction processing functionality for processing the purchase of reports. A database 217 is coupled to bus 212 to store data used with modules 216 and 218.

Figure 3:
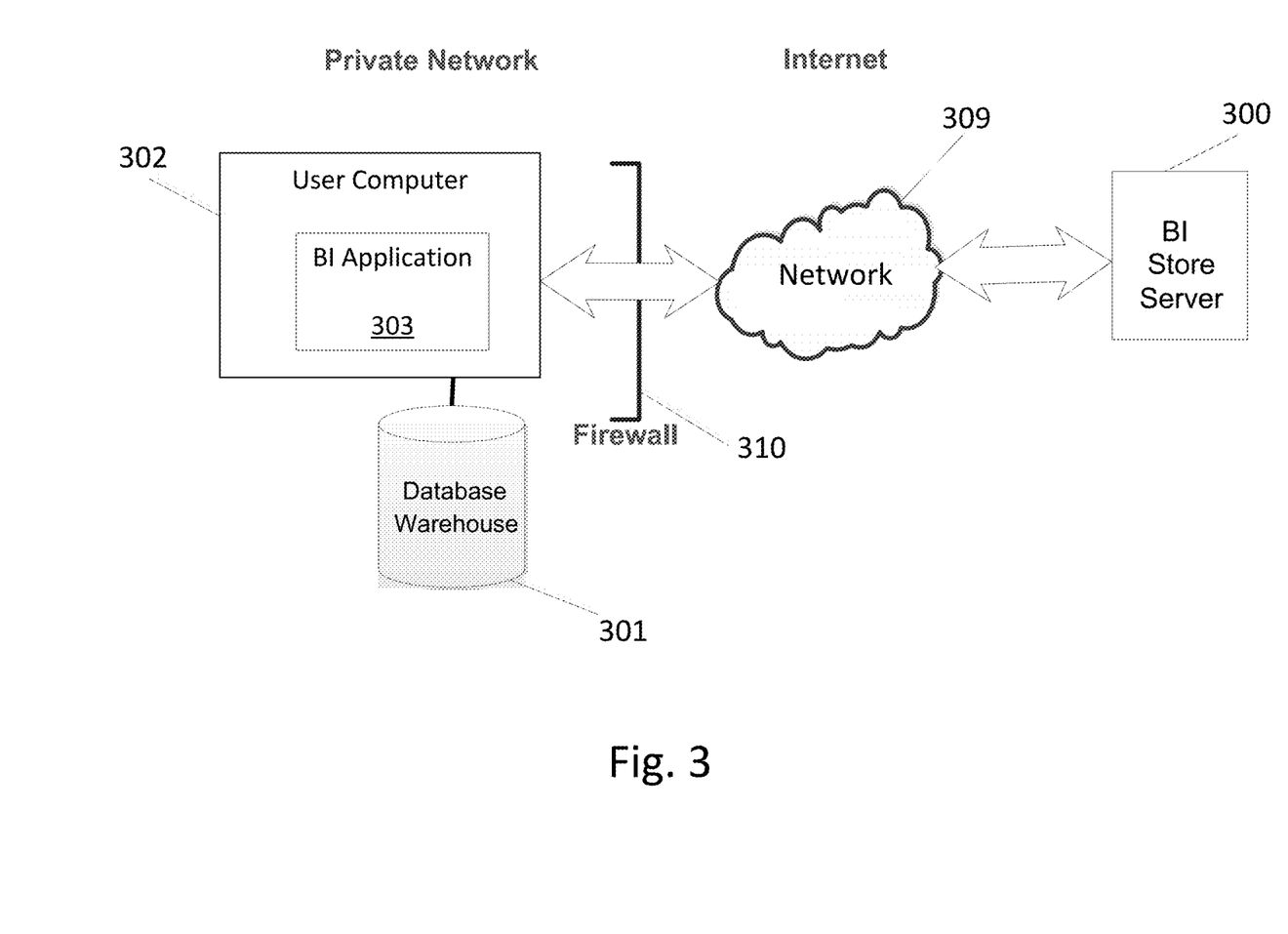
FIG. 3 is an overview block diagram of a configuration between a user computer, a business intelligence application, and a business intelligence store in accordance with one embodiment.

FIG. 3 is an overview block diagram of a configuration between a user computer 302, a business intelligence application 303, and a business intelligence ("BI") store 300 in accordance with one embodiment. BI store 300 is a server that stores configuration information (e.g., SQL code, pre-defined formatting, graphs, descriptive text, etc.) for generating reports and stores usage information of the reports. BI store 300 can be available to the public or to a group of users that use a cloud service. BI store 300 stores reports that are configured by developers who may or may not be employees of the company of BI store 300. BI store 300 does not have access to user database 301. User computer 302 can be any type of device that allows a user to run business intelligence application 303, including a laptop computer, smart phone, tablet, etc.

In one embodiment, BI application 303 is stored on user computer 302. In another embodiment, BI application 303 is not stored on user computer 302, and user 302 computer interacts with BI application 303 using hypertext transfer protocol ("HTTP") or hypertext transfer secure protocol ("HTTPS"), for example. In another embodiment, BI application 303 may be installed on the user's network. The user's network may be separated from the Internet by a firewall 310. In another embodiment, user database 301, user computer 302, BI application 303, and BI store 300 may all be on a same network (e.g., such as over the Internet or over a private cloud), while ensuring that BI Store 300 is unable to access user business data within user database 301. User database 301 may require entry of proper database credentials to access the user business data and thus prevent BI store 300 from accessing the user business data, for example. In other words, user database 301 may prevent access to user business data by BI store 300 by means other than a network firewall. In another embodiment, BI application 303 may be a web-based application and may be provided by the same company as that of BI store 300. BI application 303 may store the administrative credentials to access user database 301. BI application 303 may also prompt users for credentials to access user database 301 as needed, instead of storing credential information. BI application 303 also allows a user to set up a user profile including the user's information required to consume reports from BI store 300, such as customer identity, billing address, credit card number, preferences, name, and version of the business application that they need reports for (such as Oracle CRM OnDemand Release 19), etc.

BI application 303 interacts with BI store 300 in order to retrieve configuration details from BI store 300. BI application 303 may communicate with BI store 300 via web services, or via a direct database connection (DBLINK), or via any type of application programming interface (API). In FIG. 3, BI application 303 interfaces with BI store 300 via network 309. Network 309 can be any type of communication network, such as the Internet.

Upon retrieving configuration details from BI store 300, BI application 303 connects to user database 301 to run queries based upon the configuration details and then provides formatted output to user computer 302. BI application 303 may communicate with user database 301 via a direct database connection.

In another embodiment, BI application 303 maintains a set of local user credentials that indicate which employees in a company have access to run/buy reports from BI store 300.

In another embodiment, BI store 300 includes a database of its own and also includes programmatic capability to process transactions (e.g., report creation, user registration, user charging, assembly of SQL code, etc.). Programs of certain programming languages (such as Java, PL/SQL, etc.) would be written to interact with external requests as well as with a local BI store database.

In another embodiment, BI application 303 and BI store 300 allow a user to preview a report. For example, the user may be able to run a report that displays randomized data. A report displaying randomized data would allow the user to see what the report would look like prior to actually paying for the report. In another example, the user previews a report that displays only a portion of the report (e.g., a preview report that includes only the first five data rows) prior to actually paying for the report. In another example, the user previews a preview page that may be a screen shot of an example provided by the developer of the report. In another example, the user may freely use the report for a trial period. After the trial period ends, the user will no longer be able to run the report without paying. The BI Store tracks the reports which have already been tried and the dates corresponding to each trial.

In another embodiment, BI application 303 and the BI store 300 are designed to prevent users from tampering with associated application software. For example, if a user modifies any of the software modules of BI application 303, such modifications (e.g., in file size or last updated date) may result in the BI store 300 no longer honoring requests from that installation of application software. Both BI store 300 and user computer 302 can be separately implemented by system 210 of FIG. 2. Further, BI application 303 may be downloaded and installed from BI store server 300 or any other source. In another embodiment, where BI application 303 is software distributed by the company of BI store 300, the user may be required to upgrade BI application 303 to a latest available version in order to use the services of BI store 300.

Figure 4:
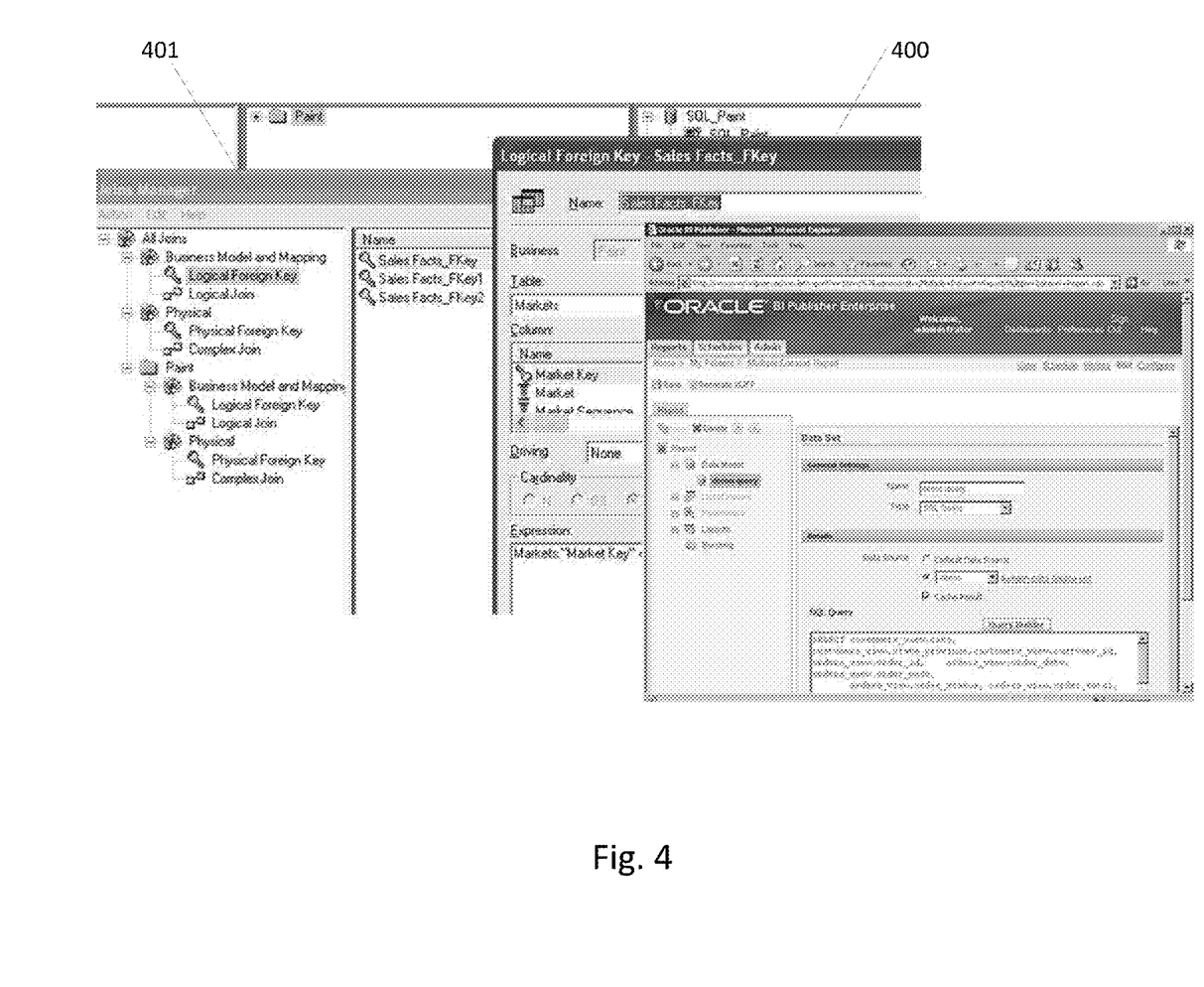
FIG. 4 is a screen shot of a developer configuring a business intelligence report via an interface in accordance with one embodiment.

FIG. 4 is screen shot of a developer configuring a business intelligence report via an interface in accordance with one embodiment. The screen shot of FIG. 4 can be generated by module 216 and/or module 218 of FIG. 2, executed on BI store server 300 of FIG. 3. As described above, the developer may or may not be an employee of the company of BI store 300 of FIG. 3. In FIG. 4, the developer uses an interface 400 to define how a report is to be configured. For example, the developer configures portions of SQL statements that determine how the report will query data tables in the user database 301 when the report is run. The developer may configure portions of SQL statements that indicate how data tables of a database are to be joined. The developer may configure portions of SQL statements that indicate table columns to be selected, and/or conditions and calculations to be applied. The developer may also configure the formatting of report output, as well as any visual charts related to the report data. The developer may also pre-configure user input parameters that the user may interact with, such as filters specified by the user at run time. The developer may also provide information about the report such as a title, description, and explanations. The developer may also indicate what business applications and versions are compatible with the report.

Figure 5:
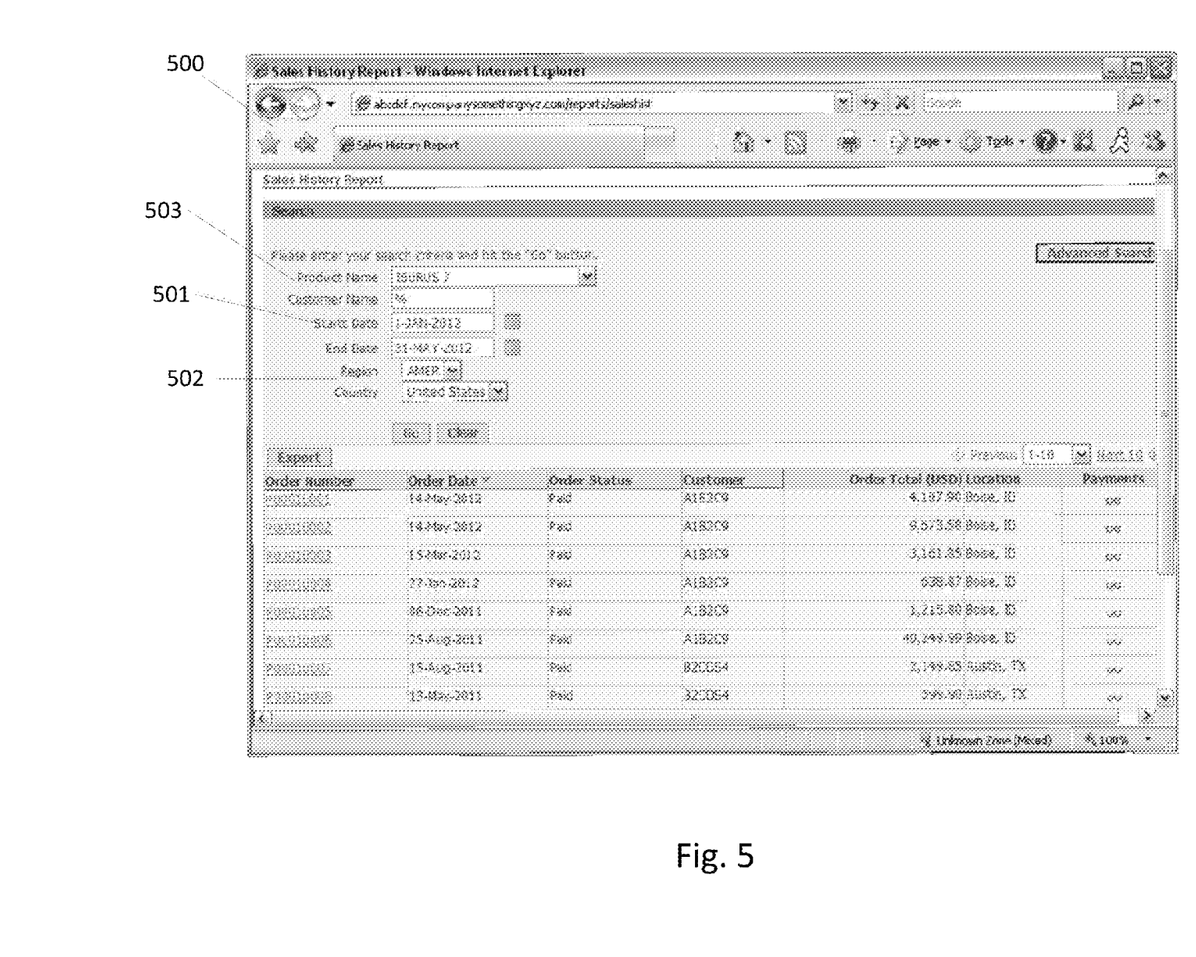
FIG. 5 is a screen shot of a user entering parameters of a business intelligence report via an interface to run the business intelligence report configured by the developer in FIG. 4.

FIG. 5 is a screen shot of a user entering parameters of a business intelligence report via an interface 500 to run the business intelligence report configured by the developer in FIG. 4. The screen shot of FIG. 5 can be generated by module 216 and/or module 218 of FIG. 2, executed on user computer 302 of FIG. 3. A user may use interface 500 (that provides a form) to enter parameters for producing the report. Parameters may include dates 501, region 502, and product names 503, for example. In another embodiment, when the BI application provides the form for entering parameters, the BI application may interact with the user database in order to provide the form. For example, if the form has a drop-down menu for selecting a product or an employee, the drop-down menu can be built by connecting the BI application to the user database and then obtaining a sample of product names or employee names.

Figure 6:
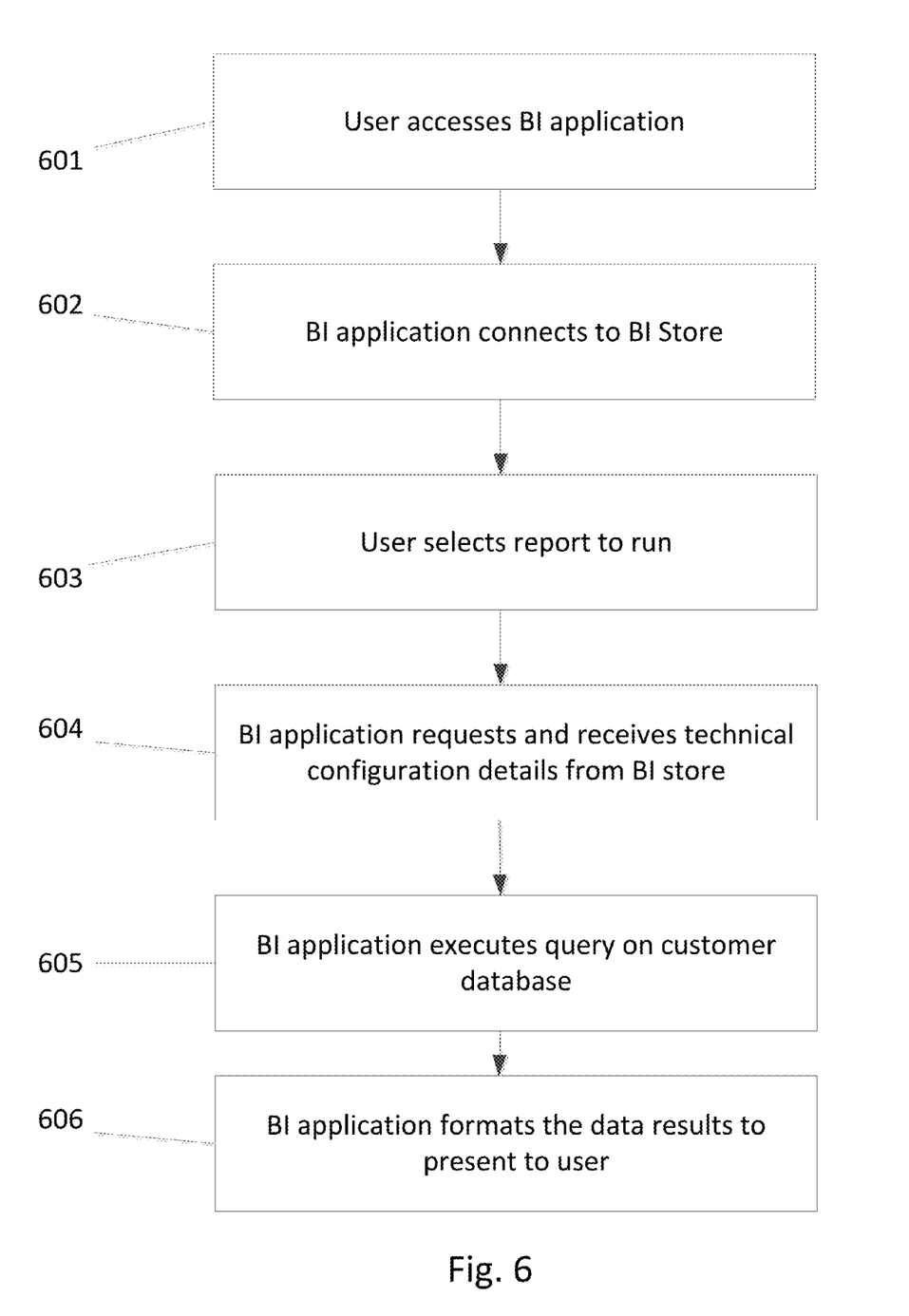
FIG. 6 is a flow diagram of the functionality of a business intelligence report provider of FIG. 2 when providing a business intelligence report in accordance with one embodiment.

FIG. 6 is a flow diagram of the functionality of business intelligence report provider 216 of FIG. 2 when providing a business intelligence report in accordance with one embodiment. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 601, user computer 302 (as shown in FIG. 3) accesses the BI application 303. As described above, in certain embodiments, BI application 303 may not be stored on user computer 302, and user computer 302 may use a web browser to connect to BI application 303. In another embodiment, BI application 303 is implemented on a private network that is separated from the Internet by firewall 310, for example.

At 602, BI application 303 connects to BI store 300 and requests a list of available reports (e.g., reports compatible with the user's business application). Along with the list of available reports, BI store 300 also provides, to BI application 303, information such as report type information, report descriptions, report prices, or user ratings of each report. BI application 303 then takes the provided information and formats the information into a page to present to the user.

At 603, the user selects the report that the user seeks to run. The user may select a new report or select a report that is already saved from previous uses. If the user is using a web browser, the web browser sends a request to BI application 303 that requests producing a report.

At 604, in response to the user's request for a report, BI application 303 requests and receives technical configuration details from BI store 300 for providing the report. These technical configuration details include, but are not limited to, optional parameters such as filters, aggregate functions, columns to display, graphs, etc. These optional parameters are determined by the developer who built the report. In one embodiment, BI application 303 then uses the technical configuration details received from BI store 300 to format a web form for the report, and displays the web form to the user. The user may then submit the web form by entering input parameters. The user then sends a request to BI application 303 to execute the report.

In one embodiment, BI application 303 then connects to BI store 300, passing the submitted input parameters from the user to BI store 300, and requests additional technical configuration details (such as SQL code, for example) for the requested report from BI store 300. If the user has sufficient funds, BI store 300 assembles a query (such as a SQL query determined by the developer of the report) and uses the submitted input parameters from the user. BI store 300 then provides the SQL statement to BI application 303. If the user does not have sufficient funds, the user receives a prompt informing that the user's funds are not sufficient.

At 605, BI application 303 executes a query corresponding to the technical configuration details (e.g., SQL statements) provided by BI store 300. BI application 303 executes the query on the user database 301. The user database 301 runs the query and returns the results to BI application 303.

At 606, BI application 303 formats the results based on a format preconfigured by the report developer, such as formatting column names, text font, charts, etc. BI application 303 responds to the user's request for a report by returning the content of the report (e.g., html content, text content, images, etc.) to the user. The user is then able to view the report on the user's web browser, for example. BI application 303 then also notifies BI store 300 that the query was successful. In another embodiment, BI application 303 measures the required time to run a report and provides these timing metrics to BI store 300. BI store 300 may then display these timing metrics to future prospective users. These timing metrics may be useful for indicating an average time for running a specific report, for example.

Upon receiving notification that the query was successful, BI store 300 charges the user. In one embodiment, BI store 300 also keeps track of unsuccessful queries in order to monitor quality issues or to monitor any suspicious activity. In another embodiment, prior to running the report for the user, BI store 300 may prompt the user (via BI application 303) to accept the charges that will be incurred by running a report.

After reviewing the provided report, the user has the option of leaving rating/feedback information about the report if they have not yet done so.

The user may re-run the same report again and again. In one embodiment, BI store 300 charges the user each time the input parameters change.

In another embodiment, a user may purchase services which allow unlimited use of a report. For payment, the user may set up funds for the specific purpose of providing payment for running reports. A user may also set up a monthly charge quota for the purpose of payment for the use of reports. A user may also set up a sub-account that provides separate quotas allocated to different employees. Payment for using the unlimited-use-service may be billed monthly. In one embodiment, the user may be prompted for immediate payment prior to running a report via a shopping-cart checkout process, which may prompt the user for billing information such as credit card information or Paypal information (if not already configured within a user profile), and then resume execution of the report upon successful payment.

As described above, certain embodiments are directed to a system for providing a business intelligence report. The system allows users to leverage the skills of experts without needing to hire these experts. As such, the system provides economic advantages to users. For example, suppose that a BI consultant charges $100/hour to run business intelligence reports. A user of the system could possibly run 100 different reports for the same cost as hiring the BI consultant for one hour. Further, the system allows a user to run reports safely, without having others access the underlying user data.

As disclosed, certain embodiments include a BI store that provides business intelligence reports for sale. The BI store allows customers to search for business intelligence reports and provide payment to use the business intelligence reports. A customer could be charged for each use of a report. Further, because the BI store is not granted access to the customer's database, security of the customer's database can be maintained. As such, certain embodiments allow customers to interact with the BI Store, pay for use of reports developed by others, while ensuring that the customers' databases are secure from third parties.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor of a server, cause the processor to specify configuration details for providing a business intelligence report for a user, the processor:
in response to a business intelligence application connecting to the server through a firewall, providing by the server a list of available pre-defined business intelligence reports that are compatible with the business intelligence application and each comprise associated configuration details;
receiving a request by the server from the business intelligence application indicating a selection of a pre-defined business intelligence report from the list of available pre-defined business intelligence reports;
in response to the request, assembling by the server a Structured Query Language (SQL) code that defines a query configured to provide the pre-defined business intelligence report; and
providing the SQL code by the server to the business intelligence application, wherein the business intelligence application performs the query on business data associated with the business intelligence application and stored in a user database that is inaccessible to the server due to the firewall, wherein data retrieved by the query is used to generate and display the business intelligence report in accordance to corresponding configuration details.

2. The computer readable medium of claim 1, the processor further charging the user a fee each time the business intelligence report is provided or charging the user once for unlimited use of the business intelligence report.

3. The computer readable medium of claim 1, wherein the business data of the user database remains on a network inaccessible to a public entity or to a provider of the pre-defined business intelligence report.

4. The computer readable medium of claim 1, wherein the corresponding configuration details include a corresponding SQL code.

5. The computer readable medium of claim 1, the processor further receiving input parameters from the user via the business intelligence application, wherein the input parameters determine the corresponding configuration details.

6. The computer readable medium of claim 1, wherein the business intelligence application comprises Customer Relationship Management (CRM).

7. A method for specifying configuration details by a server for providing a business intelligence report for a user, the method comprising:
in response to a business intelligence application connecting to the server through a firewall, providing by the server a list of available pre-defined business intelligence reports that are compatible with the business intelligence application and each comprise associated configuration details;
receiving a request by the server from the business intelligence application indicating a selection of a pre-defined business intelligence report from the list of available pre-defined business intelligence reports;
in response to the request, assembling by the server a Structured Query Language (SQL) code that defines a query configured to provide the pre-defined business intelligence report; and
providing the SQL code by the server to the business intelligence application, wherein the business intelligence application performs the query on business data associated with the business intelligence application and stored in a user database that is inaccessible to the server due to the firewall, wherein data retrieved by the query is used to generate and display the business intelligence report in accordance to corresponding configuration details.

8. The method of claim 7, the specifying further comprising charging the user a fee each time the business intelligence report is provided or charging the user once for unlimited use of the business intelligence report.

9. The method of claim 7, wherein the business data of the user database remains on a network inaccessible to a public entity or to a provider of the pre-defined business intelligence report.

10. The method of claim 7, wherein the corresponding configuration details include a corresponding SQL code.

11. The method of claim 7, the specifying further comprising receiving input parameters from the user via the business intelligence application, wherein the input parameters determine the corresponding configuration details.

12. The method of claim 7, wherein the business intelligence application comprises Customer Relationship Management (CRM).

13. A system for specifying configuration details by a server for providing a business intelligence report for a user, the system comprising:
a processor of the server;
a memory coupled to the processor, the memory comprising:
a providing module that in response to a business intelligence application connecting to the server through a firewall, provides by the server a list of available pre-defined business intelligence reports that are compatible with the business intelligence application and each comprise associated configuration details;
a first receiving module that receives a request by the server from the business intelligence application indicating a selection of a pre-defined business intelligence report from the list of available pre-defined business intelligence reports, and in response to the request, the first receiving module assembling by the server a Structured Query Language (SQL) code that defines a query configured to provide the pre-defined business intelligence report; and
a first providing module that provides the SQL code by the server to the business intelligence application, wherein the business intelligence application performs the query on business data associated with the business intelligence application and stored in a user database, that is inaccessible to the server due to the firewall, wherein data retrieved by the query is used to generate and display the business intelligence report in accordance to corresponding configuration details.

14. The system of claim 13, the memory further comprising a charging module that charges the user a fee each time the business intelligence report is provided or charges the user once for unlimited use of the business intelligence report.

15. The system of claim 13, wherein the business data of the user database remains on a network inaccessible to a public entity or to a provider of the pre-defined business intelligence report.

16. The system of claim 13, wherein the corresponding configuration details include a corresponding SQL code.

17. The system of claim 13, the memory further comprising a second receiving module that receives input parameters from the user via the business intelligence application, wherein the input parameters determine the corresponding configuration details.

18. The system of claim 13, wherein the business intelligence application comprises Customer Relationship Management (CRM).

* * * * *